(12) United States Patent
Smith et al.

(10) Patent No.: US 8,661,521 B2
(45) Date of Patent: Feb. 25, 2014

(54) CONTROLLING A NETWORK CONNECTION USING DUAL-SWITCHING

(75) Inventors: Ned M. Smith, Beaverton, OR (US); Howard C. Herbert, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 1508 days.

(21) Appl. No.: 11/216,429

(22) Filed: Aug. 30, 2005

(65) Prior Publication Data

US 2007/0050842 A1     Mar. 1, 2007

(51) Int. Cl.
*H04L 29/06* (2006.01)
(52) U.S. Cl.
USPC ........................... 726/12; 713/153; 726/15
(58) Field of Classification Search
USPC .................... 726/12, 3, 11, 1, 2; 709/225
See application file for complete search history.

(56) References Cited

U.S. PATENT DOCUMENTS

| | | | |
|---|---|---|---|
| 6,226,372 B1 * | 5/2001 | Beebe et al. | 379/189 |
| 7,210,034 B2 | 4/2007 | Smith | |
| 7,373,509 B2 | 5/2008 | Aissi et al. | |
| 7,490,347 B1 | 2/2009 | Schneider et al. | |
| 7,526,541 B2 * | 4/2009 | Roese et al. | 709/223 |
| 7,574,600 B2 | 8/2009 | Smith | |
| 7,584,355 B1 | 9/2009 | Stancheva et al. | |
| 7,606,917 B1 | 10/2009 | Blagoev et al. | |
| 7,650,627 B1 | 1/2010 | Stancheva et al. | |
| 2004/0111519 A1 * | 6/2004 | Fu et al. | 709/229 |
| 2005/0201562 A1 | 9/2005 | Becker et al. | |
| 2005/0257244 A1 * | 11/2005 | Joly et al. | 726/1 |
| 2006/0168213 A1 * | 7/2006 | Richardson et al. | 709/225 |
| 2007/0006282 A1 * | 1/2007 | Durham et al. | 726/2 |
| 2007/0016939 A1 * | 1/2007 | Leibovitz et al. | 726/3 |
| 2008/0040790 A1 * | 2/2008 | Kuo | 726/12 |

OTHER PUBLICATIONS

Interlink Networks, Introduction to 802.1X for Wireless Local Area Networks, 2002, 11 pages.
Kwan, Philip, White Paper: 802.1X Port Authentication With Microsoft's Active Diretory, Version 1.0.0, Mar. 2003, Foundry Networks, 26 pages.
Intel, Intel Active Management Technology, Intel IT Tests Reducing IT Spending Through Improved Manageability, White Paper Intel IT, Aug. 2004.
Intel, Intel Active Management Technoogy, New Capabilities for Improving IT Platform Management Efficiency, Technology Brief, 2005 13 pages.
Smith, Ned, A Platform Authentication Model for Network End-Point Integrity Based on the TPM, RSA Conference 2005, 11 pages.
Aboba, B. et al, Extensible Authentication Protocol (EAP) The Internet Society (2004), 60 pages.
Port-Based Network Access Control, Sponsor: LAN/MAN /standards Committee of the IEEE Computer Society, 2001, IEEE Std 802.1X-2001, 142 pages.

* cited by examiner

*Primary Examiner* — Gilberto Barron, Jr.
*Assistant Examiner* — Izunna Okeke
(74) *Attorney, Agent, or Firm* — Blakely, Sokoloff, Taylor & Zafman LLP

(57) ABSTRACT

Embodiments of the invention are generally directed to systems, methods, and apparatuses for controlling a network connection based, at least in part, on dual-switching. In an embodiment, a tunnel proxy is coupled with a host execution environment. The tunnel proxy includes logic to provide a security protocol client and logic to provide a security protocol server. In one embodiment, the tunnel proxy provides a proxy for a policy decision point to the host execution environment. Other embodiments are described and claimed.

22 Claims, 5 Drawing Sheets

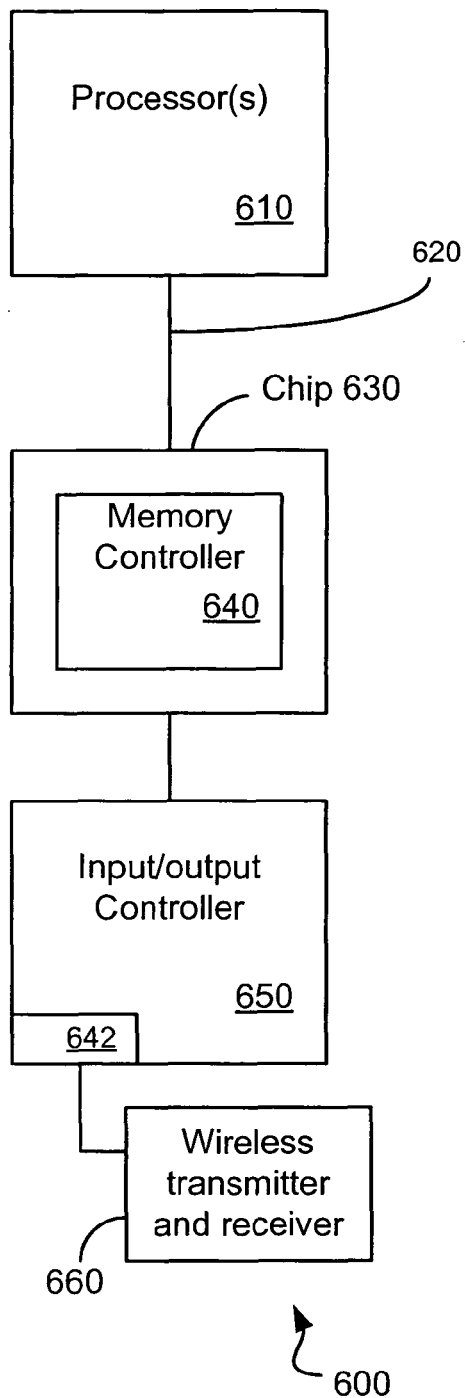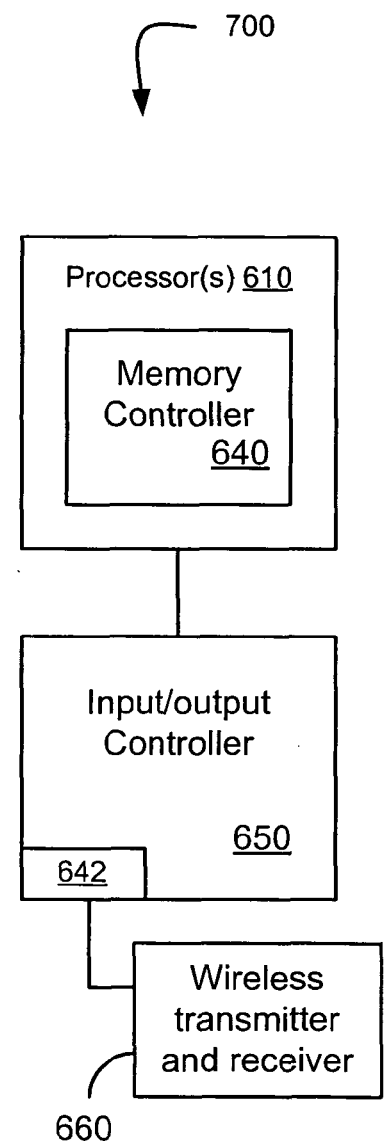
Fig. 6A
Fig. 6B

US 8,661,521 B2

CONTROLLING A NETWORK CONNECTION USING DUAL-SWITCHING

TECHNICAL FIELD

Embodiments of the invention generally relate to the field of information processing and, more particularly, to systems, methods, and apparatuses for controlling a network connection using dual switching.

BACKGROUND

A computer network (or, simply, a network) is two or more interconnected computing devices that provide voice and/or data processing. The term "network boundary" refers to a logical boundary between a network and the computing devices that are outside of the network. Various network access schemes exist to control access to a network boundary. One scheme for controlling network access involves the use of three network entities: an access requestor (AR), a policy enforcement point (PEP), and a policy decision point.

An access requestor is an entity that seeks access to a network (e.g., to a protected network). The access requestor typically includes the software, hardware, and/or firmware necessary to negotiate a connection to the network. Almost any computing device capable of negotiating a connection to a network may be an access requestor including, for example, a personal computer or a server.

A policy enforcement point is an entity that enforces the access decisions of the policy decision point. The policy enforcement point may also engage in an authentication/authorization process with the access requestor and forward the results of the authentication/authorization process to the policy decision point. A policy enforcement point is typically implemented in, for example, a switch, a firewall, and/or a Virtual Private Network (VPN) gateway.

A policy decision point is a network entity that decides whether to grant network access rights to an access requestor. The policy decision point typically grants or denies network access based, at least in part, on a network access enforcement policy (or simply, enforcement policy). In conventional networks, the policy decision point is typically implemented in a server coupled with the policy enforcement point.

The conventional approach to controlling access to a network can be described as a single-switch (e.g., single policy enforcement point) approach. That is, a single switch is used to allow or to block network traffic (e.g., all traffic or a subset of the traffic) from an access requestor. This single switch (e.g., a policy enforcement point) typically defines the edge of the network boundary.

The conventional approach to controlling network access has a number of limitations. One limitation is that the conventional approach does not enable the trusted capabilities that may be associated with an access requester to play a role in controlling access to a network. That is, the conventional approach relies on the capabilities of a single switch at the boundary of a network to control access to a network regardless of the capabilities of the access requestor.

BRIEF DESCRIPTION OF THE DRAWINGS

Embodiments of the invention are illustrated by way of example, and not by way of limitation, in the figures of the accompanying drawings in which like reference numerals refer to similar elements.

FIGS. 6A and 6B are block diagrams illustrating selected aspects of computing systems

DETAILED DESCRIPTION

Embodiments of the invention are generally directed to systems, methods, and apparatuses for using dual-switching to control access to the network. The term "dual-switching" refers to selectively using a switch on the network side and a switch on the access requestor (AR) side to control access to a network. In an embodiment, the switch on the access requestor side is part of a tunnel proxy. The tunnel proxy provides a proxy of a policy decision point to an access requestor. The tunnel proxy may include logic to implement both a security protocol client and a security protocol server. In one embodiment, the tunnel proxy extends the boundary of a network by providing selected aspects of a policy decision point and/or a policy enforcement point (PEP).

Figure 1:
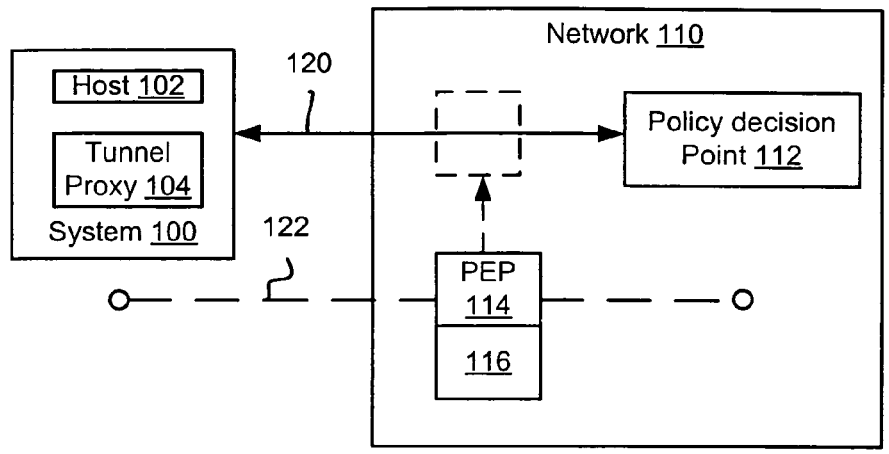
FIG. 1 is a high-level block diagram showing selected aspects of a system implemented according to an embodiment of the invention.

FIG. 1 is a high-level block diagram showing selected aspects of system 100 implemented according to an embodiment of the invention. System 100 includes host execution environment (or, simply, host) 102 and tunnel proxy 104. The term execution environment refers to a physical or virtual environment for executing program code. Host 102 may be, for example, a processor (e.g., central processing unit, management processor, etc.), a virtual machine, a virtual partition, a hardware partition, and the like.

In an embodiment, tunnel proxy 104 is a proxy for a policy decision point (e.g., policy decision point 112). The term proxy refers to an entity that includes both a client implementation and a server implementation of the entity for which it is a proxy. In an embodiment, tunnel proxy 104 includes the client and server implementations of a security protocol. In one embodiment, the security protocol is an extensible authentication protocol (EAP). The term EAP refers to any of the EAPs including the one described in Request For Comments (RFC) 3748 titled, "Extensible Authentication Protocol," (June 2004). In an alternative embodiment, a different security protocol may be used. Tunnel proxy 104 is further discussed below with reference to FIGS. 2-6.

Network 110 includes policy decision point 112 and policy enforcement point 114. Policy decision point 112 is a network entity that decides whether to grant network access rights to an access requestor based, for example, on an enforcement policy. Policy decision point 112 may be implemented in, for example, a server. In one embodiment, policy decision point 112 includes logic to implement a security protocol server (e.g., an EAP server).

Policy enforcement point 114 enforces the access decisions of policy decision point 112. Policy enforcement point 114 may be implemented in, for example, a switch, a firewall, and/or a Virtual Private Network (VPN) gateway. Enforcing the access decisions of policy decision point 112 may include, for example, selectively blocking and/or unblocking data channel 122 (and/or control channel 120). In an embodiment, policy enforcement point 114 includes enforcement policy 116 to define access to network 110. As is further described below, policy decision point 112 may synchronize the operation of policy enforcement point 114 with tunnel proxy 104 by provisioning both of them with the same (or substantially similar) enforcement policy (e.g., enforcement policy 116).

Figure 2:
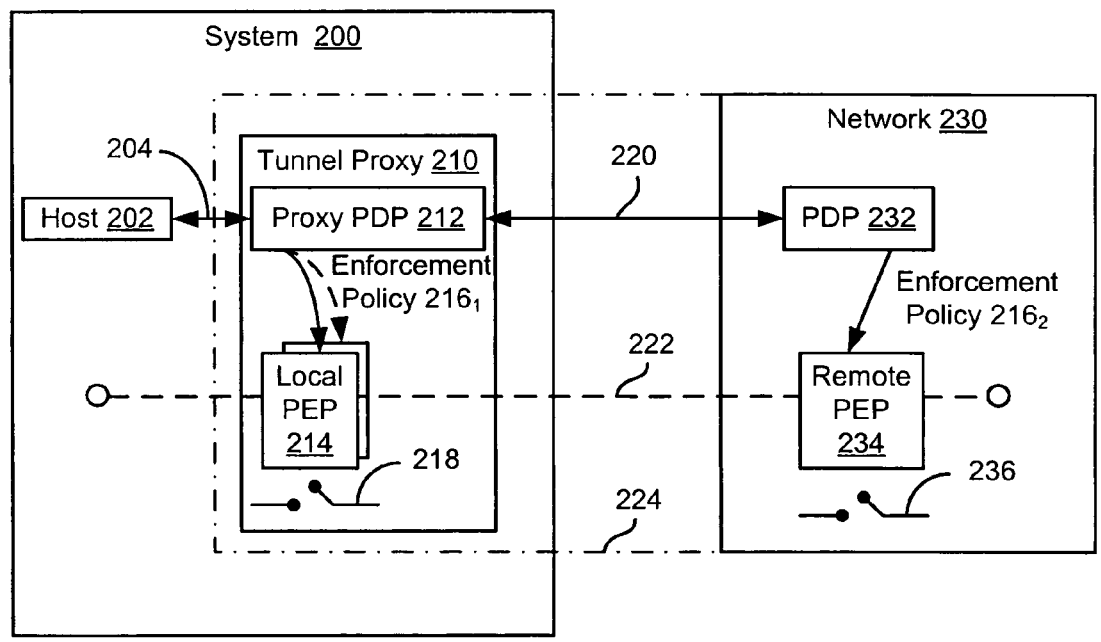
FIG. 2 is a block diagram showing selected aspects of controlling access to a network using dual-switching according to an embodiment of the invention.

FIG. 2 is a block diagram showing selected aspects of controlling access to a network using dual-switching according to an embodiment of the invention. System 200 includes host 202 and tunnel proxy 210. In one embodiment, system 200 is a circuit board (e.g., a motherboard) for a computing system. A "computing system" refers to a wide range of devices that process digitized information including, for example, a desktop computer, a laptop computer, a server, a network infrastructure device (e.g., router, switch, etc.), a digital home entertainment system, a cellular phone, and the like. System 200 includes host 202 and tunnel proxy 210. Host 202 can be either a physical or a virtual execution environment. For example, host 202 can be a processor and/or a virtual machine.

In an embodiment, tunnel proxy 210 provides both a proxy for a control channel and enforcement for a data channel. These capabilities enable system 200 to become a secure endpoint for network 230. As is further described below, tunnel proxy 210 provides secure tunnel 204 to host 202 after it has become a secure endpoint for network 230.

In an embodiment, tunnel proxy 210 is implemented within a protected environment. The protected environment isolates (or partly isolates) tunnel proxy 210 from host 202. Examples of the protected environment include a management processor, a virtual partition, a hardware partition, and the like. The protected environment provides (at least a degree of) protection from host side tampering. In an embodiment, tunnel proxy 210 may include dedicated code, storage, memory, and/or processing resources.

In an embodiment, proxy policy decision point (PDP) 212 provides a proxy for PDP 232. That is, proxy PDP 212 includes logic to implement both the server side and the client side of control channel 220. Proxy PDP 212 is a client to PDP 232 and also a server to host 202. In one embodiment, the security protocol is an EAP. In an alternative embodiment, a different security protocol and/or additional security protocols may be used.

In an embodiment, proxy PDP 212 authenticates itself to PDP 232 (e.g., using the security protocol). Proxy PDP 212 may also announce its capabilities to PDP 232. For example, proxy PDP 212 may inform PDP 232 that it is capable of operating as a proxy. In some embodiments, proxy PDP 212 includes one or more agents to enable it to act as a subordinate PDP for PDP 232. In such embodiments, proxy PDP 212 may also inform PDP 232 that it includes these capabilities.

In an embodiment, PDP 232 and proxy PDP 212 have a master/slave relationship. That is, PDP 232 acts as a master PDP and proxy PDP 212 acts as a slave PDP. In one embodiment, PDP 232 ensures that both remote PEP 234 and local PEP 214 are using the same (or substantially the same) enforcement policy (e.g., enforcement policies $216_2$ and $216_1$, respectively). PEP 214 and PEP 234 respectively control access to data channel 222 using, for example, switches 218 and 236. Switches 218 and 236 may be any switches (e.g., layer 2 and/or layer 3) suitable for blocking and unblocking a data channel. Data channel 222 (and control channel 220) may be wired, wireless, or any combination thereof.

Proxy PDP 212 provides local (from the perspective of system 200) enforcement of data channel 222 using local PEP 214. Local PEP 214 enforces the access decisions of a PDP (e.g., proxy PDP 212 and/or PDP 232). Local PEP 214 extends the boundary of network 230 to (at least a part of) system 200 because it enforces access to network 230. In an embodiment, enforcement of data channel 222 can be dynamically rolled back to remote PEP 234 if needed. For example, if system 200 is attacked then the boundary of network 230 can be dynamically rolled-back to remote PEP 234. Remote PEP 234 then enforces access to data channel 222. In an embodiment, this process of dynamically extending and retracting the boundary of the network can be iterated across an arbitrary number of tunnel proxies. Reference number 224 illustrates how network 230 can be dynamically extended to (and/or retracted from), at least a part of, system 200.

Figure 3:
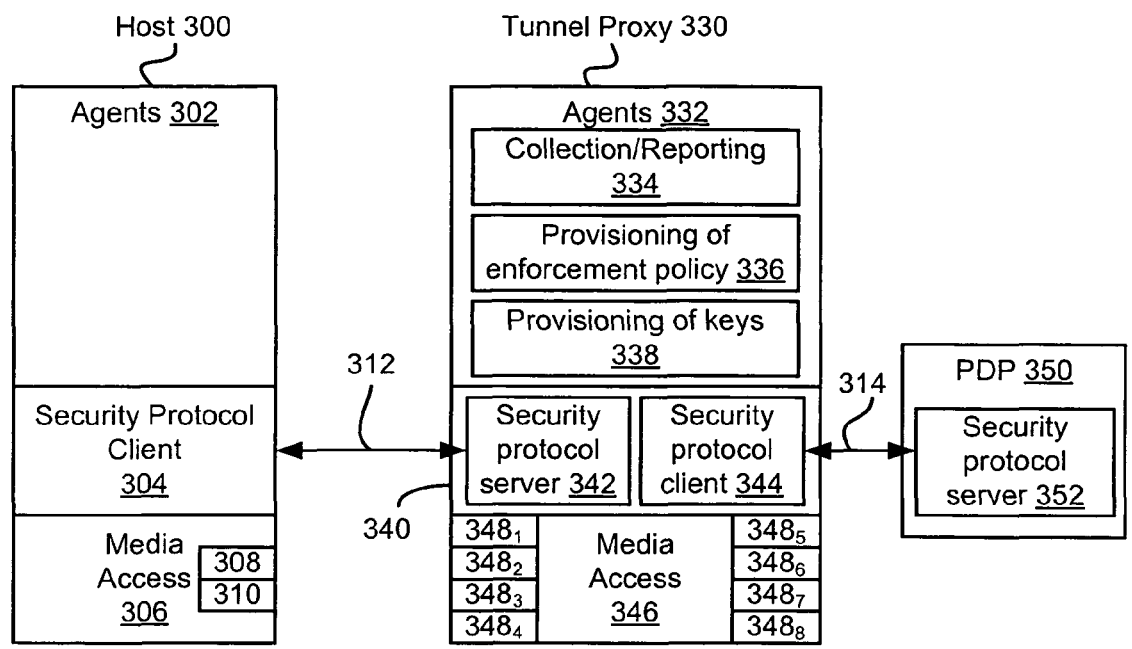
FIG. 3 is a functional block diagram of selected aspects of a tunnel proxy according to an embodiment of the invention.

FIG. 3 is a functional block diagram of selected aspects of a tunnel proxy according to an embodiment of the invention. In an embodiment, tunnel proxy 330 is implemented within a protected partition on the same circuit board (e.g., motherboard) as host 300. The protected partition may be a physical partition or a virtual partition. In one embodiment, tunnel proxy 330 is implemented using Intel® Active Management Technology. In the illustrated embodiment, tunnel proxy 330 includes media access module 346, security protocol implementation 340, and agents 332. In an alternative embodiment, tunnel proxy 330 may include more elements, fewer elements, and/or different elements.

Media access module 346 provides access to one or more different kinds of physical media. Media access module 346 includes drivers 348. Drivers 348 support access to a physical layer. In an embodiment, each driver 348 can be used to create a virtual private network. In one embodiment, media access module 346 can provide one or more control channels. In addition, media access module 346 may provide one or more data channels. Media access module 346 may be implemented in hardware, software, firmware, or any combination thereof.

Security protocol implementation 340 enables tunnel proxy 330 to support secure communications. In an embodiment, security protocol implementation 340 includes server implementation 342 and client implementation 344. Server implementation 342 allows tunnel proxy 330 to act as a PDP server to host 300 (e.g., via security protocol client 304). Client implementation 344 allows tunnel proxy 330 to act as a PDP client to, for example, PDP 350. Since security protocol implementation 340 includes both a PDP server and a PDP client, it can provide a proxy of PDP 350 to host 300.

Security protocol implementation 340 is an implementation of a send/receive security protocol. For example, in an embodiment, security protocol implementation 340 is an implementation of an EAP. In an alternative embodiment, security protocol implementation 340 implements a different and/or an additional protocol. Security protocol implementation 340 may be implemented in hardware, software, firmware, or any combination thereof.

Agents 332 provide one or more capabilities that allow tunnel proxy 330 to act as a subordinate PDP to another PDP (e.g., a subordinate to PDP 350). For example, collection/reporting agent 334 allows tunnel proxy 330 to collect integrity measurement data from host 300 and to report the collected data to PDP 350. The term "integrity measurement data" broadly refers to empirical data collected from the hardware, software, and/or firmware components of host 300. Examples of integrity measurement data include anti-virus parameters, firewall status, software versions, hardware status, log/trace files, and the like. In an embodiment, tunnel proxy 330 provides the results of the assessment to, for example, PDP 350.

In an embodiment, agent 336 enables tunnel proxy 330 to provision an enforcement policy to one or more local PEPs (e.g., local PEP 214, shown in FIG. 2). In one embodiment, the enforcement policy provided to the local PEP is the same (or substantially the same) as an enforcement policy provided to other PEPs that are associated with the same data channel (e.g., remote PEP 234, shown in FIG. 2). A master PDP (e.g., PDP 232, shown in FIG. 2) may synchronize the distribution of the enforcement policy to each PEP that is associated with a data channel. This helps to ensure that all PEPs associated with the data channel process traffic in a consistent manner. In addition, it allows the edge of the network to be dynamically extended or retracted because each PEP is capable of enforcing access based on the proper enforcement policy.

In an embodiment, tunnel proxy 330 supports virtual private networks. For example, the local PEP provided by tunnel proxy 330 may support virtual private networks on the data channel it controls. Agent 338 enables tunnel proxy 330 to provision encryption keys to the VPNs. In an embodiment, the provisioning of keys is synchronized in substantially the same way as the provisioning of enforcement policies.

In an embodiment, host 300 is implemented on the same board as tunnel proxy 330. From the perspective of host 300, tunnel proxy 330 provides a proxy of a control channel. For example, tunnel proxy 330 provides control channel 312 to host 300 which is a proxy of control channel 314. Host 300 includes agents 302, security protocol client 304, and media access module 306. Media access module 306 includes drivers 308 and 310. Drivers 308 and 310 provide access to one or more physical media.

In an embodiment, PDP 350 acts as a master PDP to tunnel proxy 330. That is, PDP 350 authenticates tunnel proxy 330 and provides a network access enforcement policy to it. In an embodiment, PDP 350 synchronizes the distribution of the enforcement policy to the PEPs that are associated with a data channel. PDP 350 includes security protocol server 352 to act as a PDP server to tunnel proxy 330. In an embodiment, security protocol server 352 is an implementation of an EAP server. In an alternative embodiment, security protocol server 352 implements a different security protocol.

In an embodiment, security protocol clients 304 and/or 342 can open a secure control channel that tunnels through one or more slave PDPs/tunnel proxies (330) to arrive at a protocol server (e.g., security protocol server 352 in master PDP 350). In such an embodiment, each protocol client (e.g., 304 and/or 344) may share a trust relationship with any PDP. If each endpoint is implemented in an address space that has different security and trust properties, then those properties can be evaluated directly without proxy aggregation/integration (e.g., using agent 334).

In an embodiment, this capability compliments the ability of tunnel proxy 330 to perform aggregation and intervention when the master PDP (e.g., PDP 350) requests aggregation and intervention. For example, a local PDP may consume integrity reports (e.g., using agents 334) that are meaningful to a regional information technology policy while forwarding reports and aggregates to a central PDP (e.g., master PDP 350). The term integrity report refers to a report that is based, at least in part, on integrity measurement data. The flexibility to proxy or to forward at every tunnel proxy (e.g., tunnel proxy 430, shown in FIG. 4) allows a set of tunnel proxies to work together to implement dual switching. For example, a set of tunnel proxies (TP1, TP2, and TP3) could implement dual switching between TP1 and TP3. TP2 may serve as an alternate for TP3. If TP3 fails or is taken down for maintenance, TP2 can take the place of TP3.

Figure 4:
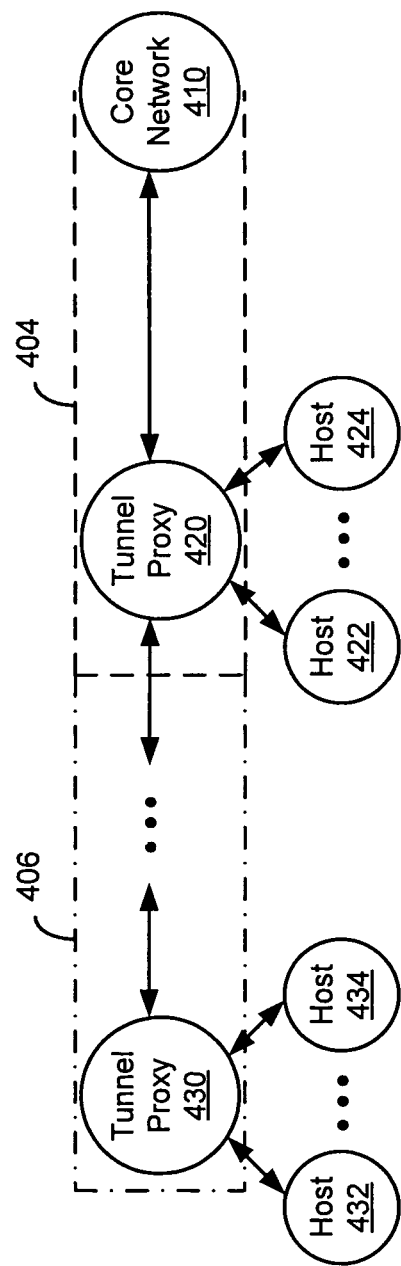
FIG. 4 is a conceptual representation of a chain of network extensions that is created using tunnel proxies.

FIG. 4 is a conceptual representation of a chain of network extensions that is created using tunnel proxies. In an embodiment, the edge of a network can be dynamically extended (or retracted) using an arbitrary number of tunnel proxies. Core network 410 delineates the initial boundary of a network. Tunnel proxy 420 authenticates itself to core network 410 using, for example, a security protocol such as EAP. After tunnel proxy 420 is authenticated, the boundary of the network is extended to include tunnel proxy 420. Dashed line 404 illustrates that the network is extended to include tunnel proxy 420 but not necessarily hosts 422-424. The reason for this is that tunnel proxy 404 can be trusted because it is implemented within a protected partition. Hosts 422-424, however, cannot necessarily be trusted because they are not implemented within the protected partition.

Tunnel proxy 420 (and/or hosts 422-424) may have the capability to discover other nodes (e.g., using WI-FI and/or WI-MAX). Using this capability, tunnel proxy 420 discovers, for example, tunnel proxy 430. Tunnel proxy 430 authenticates itself to tunnel proxy 420 using a security protocol such as EAP. After tunnel proxy 430 is authenticated, the boundary of the network is extended to include tunnel proxy 430 as shown by 406. In an embodiment, tunnel proxy 430 provides a proxy of a control channel and enforcement of a data channel to hosts 432-434. In one embodiment, the process of dynamically extending the edge of the network can be repeated an arbitrary number of times.

Figure 5:
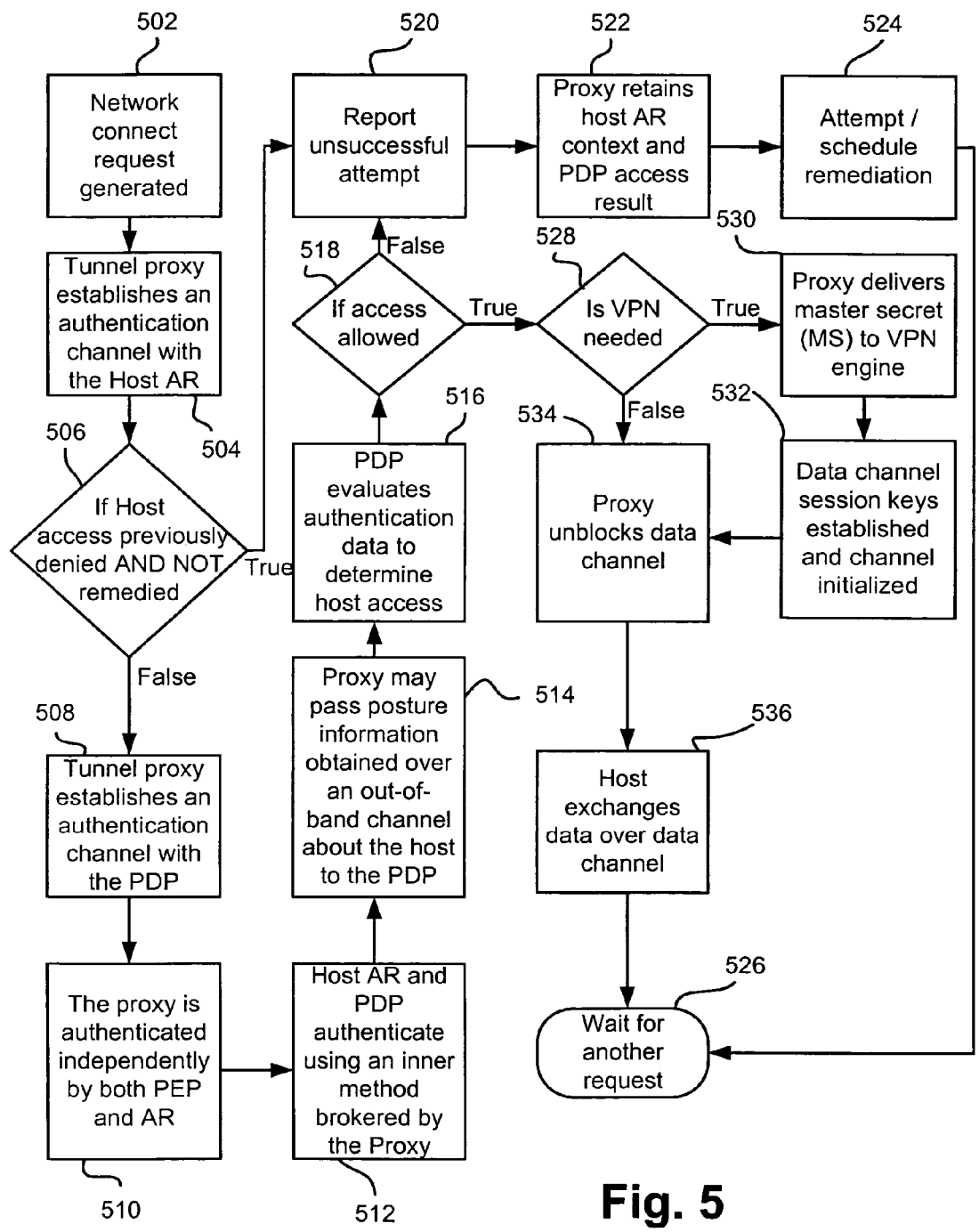
FIG. 5 is a flow diagram illustrating selected aspects of proxy data flow according to an embodiment of the invention.

FIG. 5 is a flow diagram illustrating selected aspects of proxy data flow according to an embodiment of the invention. A network connect request is generated at 502. A tunnel proxy (e.g. tunnel proxy 210, shown in FIG. 2) establishes an authentication channel with a host at 504. The authentication channel may be based, at least in part, on a security protocol such as EAP.

In an embodiment, the tunnel proxy stores information related to previous access attempts by the host. For example, the tunnel proxy may store information indicating whether the host has been previously denied access to a network. If the host has been denied access to a network, then remedial action may be appropriate (e.g., updating antivirus software and/or a firewall). The tunnel proxy may store information indicating whether the remedial action has been performed. In an embodiment, the tunnel proxy uses this information to determine whether the host was previously denied access to a network and, if so, whether appropriate remedial action was performed (506).

In an embodiment, the tunnel proxy does not allow the host to access the network if it has previously been denied access to the network and appropriate remedial action has not been performed. Instead, it reports the unsuccessful connection attempt to, for example, the master PDP as shown by 520. In an embodiment, the tunnel proxy retains (at least a portion of) the host context and the PDP access result (522). The tunnel proxy may attempt to schedule an appropriate remedial action at 524. In one embodiment, the tunnel proxy waits for another network connect request (526), after attempting to schedule the appropriate remedial action (if any).

Referring to 508, if the host has not previously been denied access (or if remediation has been performed), then the tunnel proxy establishes an authentication channel (e.g., a control channel) with the PDP (e.g., with PDP 232, shown in FIG. 2). In an embodiment, the tunnel proxy uses an implementation of a security protocol to establish the authentication channel (e.g., EAP). The tunnel proxy may include logic to implement both the client and the server of the security protocol. The tunnel proxy may be independently authenticated by both the local PEP and the host (e.g., acting as the AR). In an embodiment, the host and the PDP authenticate the tunnel proxy using an inner method brokered by the tunnel proxy (512).

In an embodiment, the tunnel proxy collects integrity measurement data (e.g., posture information) from the host over an out-of-band channel. The tunnel proxy may pass this integrity measurement data to the PDP over the control channel (e.g., control channel 220, shown in FIG. 2) at 514. In an embodiment, the PDP decides whether to allow network access to the host based, at least in part, on an evaluation of the integrity measurement data that it receives (516). If the PDP denies access to the host, then the data flow may follow 520-526 as discussed above (518).

In some embodiments, the tunnel proxy supports virtual private networks (VPNs) over, for example, the data channels. Referring to process block 528, the tunnel proxy determines whether a VPN is appropriate for the network connection. For example, the tunnel proxy may determine whether the host has requested a tunnel proxy. If a VPN is appropriate, then the tunnel proxy delivers a master secret to a VPN engine at 530. The tunnel proxy establishes session keys and initializes the data channel at 532. In an embodiment, a PDP (e.g., PDP 232, shown in FIG. 2) delivers a master session key and/or established session keys to the other endpoints associated with the data channel to synchronize, at least in part, the enforcement policies of the endpoints. In one embodiment, the tunnel proxy delivers the master secret to a local VPN engine and the PDP delivers the master secret to a remote VPN engine.

The tunnel proxy unblocks the data channel at 534 (e.g., using switch 218, shown in FIG. 2). In an embodiment, a PDP (e.g., PDP 232, shown in FIG. 2) instructs the tunnel proxy to unblock the data channel. For example, the PDP may synchronize the switch/filter rules of the local PEP (e.g., the PDP-side PEP) and unblock the remote PEP (e.g., the PDP-side PEP such as, PEP 234, shown in FIG. 2). In one embodiment, each PEP marks a point indicating where a network boundary may be rolled-back to in cases where a defense in depth policy requires rollback of the network boundary. In an embodiment, the PDP can dynamically extend or retract the boundary of the network by instructing the tunnel proxy to open or close the switch. The host exchanges data with other nodes in the network over the data channel at 536. The tunnel proxy waits for another network connect request (526). The proxy data flow may return to process block 502, when another network request is generated.

FIGS. 6A and 6B are block diagrams illustrating, respectively, selected aspects of computing systems 600 and 700. Computing system 600 includes processor 610 coupled with an interconnect 620. In some embodiments, the term processor and central processing unit (CPU) may be used interchangeably. In one embodiment, processor 610 is a processor in the XEON® family of processors available from Intel Corporation of Santa Clara, Calif. In an alternative embodiment, other processors may be used. In yet another alternative embodiment, processor 610 may include multiple processor cores.

According to one embodiment, interconnect 620 communicates with chip 630. In one embodiment, chip 630 is a component of a chipset. Interconnect 620 may be a point-to-point interconnect or it may be connected to two or more chips (e.g., of the chipset). Chip 630 includes memory controller 640 which may be coupled with main system memory (e.g., as shown in FIG. 1). In an alternative embodiment, memory controller 640 may be on the same chip as processor 610 as shown in FIG. 6B. In an embodiment, tunnel proxy 642 provides a proxy to a control channel and enforcement for a data channel. For ease of description, tunnel proxy is shown as a block within I/O controller 650. In an alternative embodiment, tunnel proxy 642 may be implemented in a different part of the chipset and/or may be distributed across multiple components of the chipset. In yet another alternative embodiment, tunnel proxy 642 may be implemented within a protected partition on processor 610.

Input/output (I/O) controller 650 controls the flow of data between processor 610 and one or more I/O interfaces (e.g., wired and wireless network interfaces) and/or I/O devices. For example, in the illustrated embodiment, I/O controller 650 controls the flow of data between processor 610 and wireless transmitter and receiver 660. In an alternative embodiment, memory controller 640 and I/O controller 650 may be integrated into a single controller.

Elements of embodiments of the present invention may also be provided as a machine-readable medium for storing the machine-executable instructions. The machine-readable medium may include, but is not limited to, flash memory, optical disks, compact disks-read only memory (CD-ROM), digital versatile/video disks (DVD) ROM, random access memory (RAM), erasable programmable read-only memory (EPROM), electrically erasable programmable read-only memory (EEPROM), magnetic or optical cards, propagation media or other type of machine-readable media suitable for storing electronic instructions. For example, embodiments of the invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

What is claimed is:

1. An apparatus comprising:
   a host execution environment; and
   a tunnel proxy coupled with the host execution environment, the tunnel proxy to provide a proxy of a remote policy decision point to the host execution environment, wherein the tunnel proxy includes logic to provide a security protocol client to the remote policy decision point and logic to provide a security protocol server to the host execution environment, the tunnel proxy to implement a local switch to control access to a network channel that also has a remote switch to control access to the same channel, the tunnel proxy to be authenticated by the remote policy decision point before providing the proxy of the remote policy decision point, the local switch controlled by a first enforcement policy maintained by the proxy of the remote policy decision point, the remote switch controlled by a second enforcement policy maintained by the remote policy decision point, the first enforcement policy being the same as the second enforcement policy such that the tunnel proxy and the remote policy decision point together determine whether the host execution environment is able to use the channel, wherein the tunnel proxy further comprises at least one of:

collection logic, the collection logic to collect integrity measurement data associated with the host; and reporting logic, the reporting logic to enable the tunnel proxy to report the integrity measurement data to a remote policy decision point.

2. The apparatus of claim 1, wherein the host execution environment includes at least one of:

a processor;

a partitioned core; and a virtual machine.

3. The apparatus of claim 1, wherein the tunnel proxy is part of a protected execution environment.

4. The apparatus of claim 3, wherein the protected execution environment is at least one of:

a virtual partition;

a hardware partition; and a management processor.

5. The apparatus of claim 4, wherein the security protocol is the extensible authentication protocol.

6. The apparatus of claim 1, wherein the tunnel proxy further comprises:

a provisioning agent, the provisioning agent including logic to provision a local policy enforcement point with an enforcement policy.

7. The apparatus of claim 1, wherein the tunnel proxy further comprises:

a media access module, the media access module to provide physical media access to one or more physical media.

8. The apparatus of claim 1, wherein the local switch is to control access to at least one of a control channel and a data channel.

9. A method comprising:

authenticating a tunnel proxy to a remote policy decision point, wherein the tunnel proxy is to provide a proxy for the remote policy decision point;

receiving a network connection request from a host coupled with the tunnel proxy;

determining, at the tunnel proxy to the remote policy decision point, whether to grant access to a network channel to the host based, at least in part, on a first enforcement policy, the first enforcement policy maintained by the tunnel proxy to the remote policy decision point; and unblocking a data channel at a local enforcement point to allow the host local access to the network channel having a remote enforcement point, if the access is granted to the host, the remote enforcement point's granting or not granting the host access to the same network channel determined from a second enforcement policy maintained by the remote policy decision point, the first and second enforcement policies being the same such that the tunnel proxy and the remote policy decision point together determine whether the host execution unit is able to use the channel;

collecting integrity measurement data from the host; and, providing the collected integrity measurement data to the remote policy decision point.

10. The method of claim 9, wherein authenticating the tunnel proxy to the remote policy decision point further comprises:

authenticating the tunnel proxy to the remote policy decision point based, at least in part, on a security protocol client implementation.

11. The method of claim 10, wherein the security protocol client implementation is an implementation of an extensible authentication protocol client.

12. The method of claim 9, wherein determining whether to grant access to the network channel to the host further comprises:

determining whether the host was previously denied access to a network; and reporting a previous unsuccessful attempt to access the network to the remote policy decision point, if the host was previously denied access to the network.

13. The method of claim 9, further comprising:

provisioning the local enforcement point with the first enforcement policy.

14. A system comprising:

a processor;

a volatile memory coupled with the processor to provide main memory for the processor; and a tunnel proxy coupled with the processor to dynamically extend and/or retract a secure network boundary, the tunnel proxy to provide a proxy of a policy decision point, wherein the tunnel proxy includes logic to provide a security protocol client and logic to provide a security protocol server, and wherein, the proxy of the policy decision point and the policy decision point maintain the same enforcement policy along a same channel such that the proxy of the policy decision point and the policy decision point together determine whether the same channel is useable, and wherein, the policy decision point is separated from the proxy of the policy decision point by a network, wherein the tunnel proxy has associated collection logic and reporting logic, the collection logic to collect integrity measurement data associated with a host, the reporting logic to enable the tunnel proxy to report the integrity measurement data to a remote policy decision point.

15. The system of claim 14, wherein the volatile memory is a dynamic random access memory (DRAM).

16. The system of claim 14, wherein the tunnel proxy is part of a protected execution environment.

17. The system of claim 14, further comprising:

a wireless transmitter and receiver.

18. The system of claim 14, wherein the security protocol is the extensible authentication protocol.

19. A machine readable storage medium containing program code that when processed by one or more processors of a computer cause a method to be performed, said method comprising:

authenticating a tunnel proxy to a remote policy decision point, wherein the tunnel proxy is to provide a proxy for the remote policy decision point;

receiving a network connection request from a host coupled with the tunnel proxy;

determining, at the tunnel proxy to the remote policy decision point, whether to grant access to a network channel to the host based, at least in part, on a first enforcement policy, the first enforcement policy maintained by the tunnel proxy to the remote policy decision point; and unblocking a data channel at a local enforcement point to allow the host local access to the network channel having a remote enforcement point, if the access is granted to the host, the remote enforcement point's granting or not granting the host access to the same network channel determined from a second enforcement policy maintained by the remote policy decision point, the first and second enforcement policies being the same such that the tunnel proxy and the remote policy decision point together determine whether the host execution unit is able to use the channel;

receiving at said tunnel proxy an authentication from a second tunnel proxy;

authenticating said second tunnel proxy to dynamically extend a network boundary.

20. The machine readable medium of claim 19 wherein authenticating the tunnel proxy to the remote policy decision point further comprises:

authenticating the tunnel proxy to the remote policy decision point based, at least in part, on a security protocol client implementation.

21. The machine readable medium of claim 19 wherein the security protocol client implementation is an implementation of an extensible authentication protocol client.

22. The machine readable medium of claim 19 wherein determining whether to grant access to the network channel connection to the host further comprises:

determining whether the host was previously denied access to a network; and reporting a previous unsuccessful attempt to access the network to the remote policy decision point, if the host was previously denied access to the network.

* * * * *